United States Patent
Ko et al.

(10) Patent No.: US 6,765,736 B2
(45) Date of Patent: Jul. 20, 2004

(54) WRITE-SAFE CONDITION VERIFICATION APPARATUS AND METHOD FOR THE WRITE ELEMENT IN A DISC DRIVE

(75) Inventors: Beng Theam Ko, Singapore (SG); Eng Hock Lim, Singapore (SG); Victor WengKhin Chew, Singapore (SG); Myint Ngwe, Singapore (SG); Kah Liang Gan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 185 days.

(21) Appl. No.: 10/056,496

(22) Filed: Jan. 24, 2002

(65) Prior Publication Data

US 2003/0002187 A1 Jan. 2, 2003

Related U.S. Application Data

(60) Provisional application No. 60/302,195, filed on Jun. 29, 2001.

(51) Int. Cl.$^7$ .............................. G11B 5/09; G11B 5/02
(52) U.S. Cl. .............................. 360/46; 360/67; 360/53
(58) Field of Search .............................. 360/46, 67, 53, 360/60, 51, 31, 78.14, 66, 75, 62, 63, 68

(56) References Cited

U.S. PATENT DOCUMENTS

| | | |
|---|---|---|
| 5,495,378 A | 2/1996 | Bonyhard et al. |
| 5,737,152 A | 4/1998 | Balakrishnan |
| 5,754,369 A | 5/1998 | Balakrishnan |
| 5,812,344 A | 9/1998 | Balakrishnan |
| 5,909,342 A | 6/1999 | Forbord et al. |
| 6,014,281 A | 1/2000 | Contreras |
| 6,266,202 B1 | 7/2001 | Nguyen et al. |

*Primary Examiner*—David Hudspeth
*Assistant Examiner*—Natalia L Figueroa
(74) *Attorney, Agent, or Firm*—Kirk A. Cesari

(57) ABSTRACT

A disc drive with on-the-fly verification of an enabled condition of the write element, comprising a rotatable disc having a magnetic recording surface, and a data reading and writing assembly. The data reading and writing assembly comprises a read/write head comprising a write element and a read element, both adjacent the recording surface; a preamplifier comprising a write driver applying a series of write currents for writing data to the recording surface and a read amplifier for reading stored data from the recording surface; and an interconnect joining the write driver to the write element so as to generate time-varying magnetic fields selectively magnetizing the recording surface in response to the write currents, and joining the read amplifier to the read element so as to transduce magnetization vectors on the recording surface associated with stored data. The disc drive furthermore comprises a detection circuit connected to the data reading and writing assembly, receiving a write-safe signal indicative of a write-safe condition, the write-safe signal comprising a sum of constituent operable magnetic coupling values of the read/write head, the preamplifier and the interconnect. The detection circuit is preferably connected to the preamplifier and receives the write-safe signal when a bias current is directed to the read element while writing data to the recording surface, such that a reversal in the writing current generates an electromagnetic coupling effect in the bias current. An advantageous construction comprises adaptively connecting the detection circuit to the analog buffer head voltage terminal of the preamplifier.

20 Claims, 6 Drawing Sheets

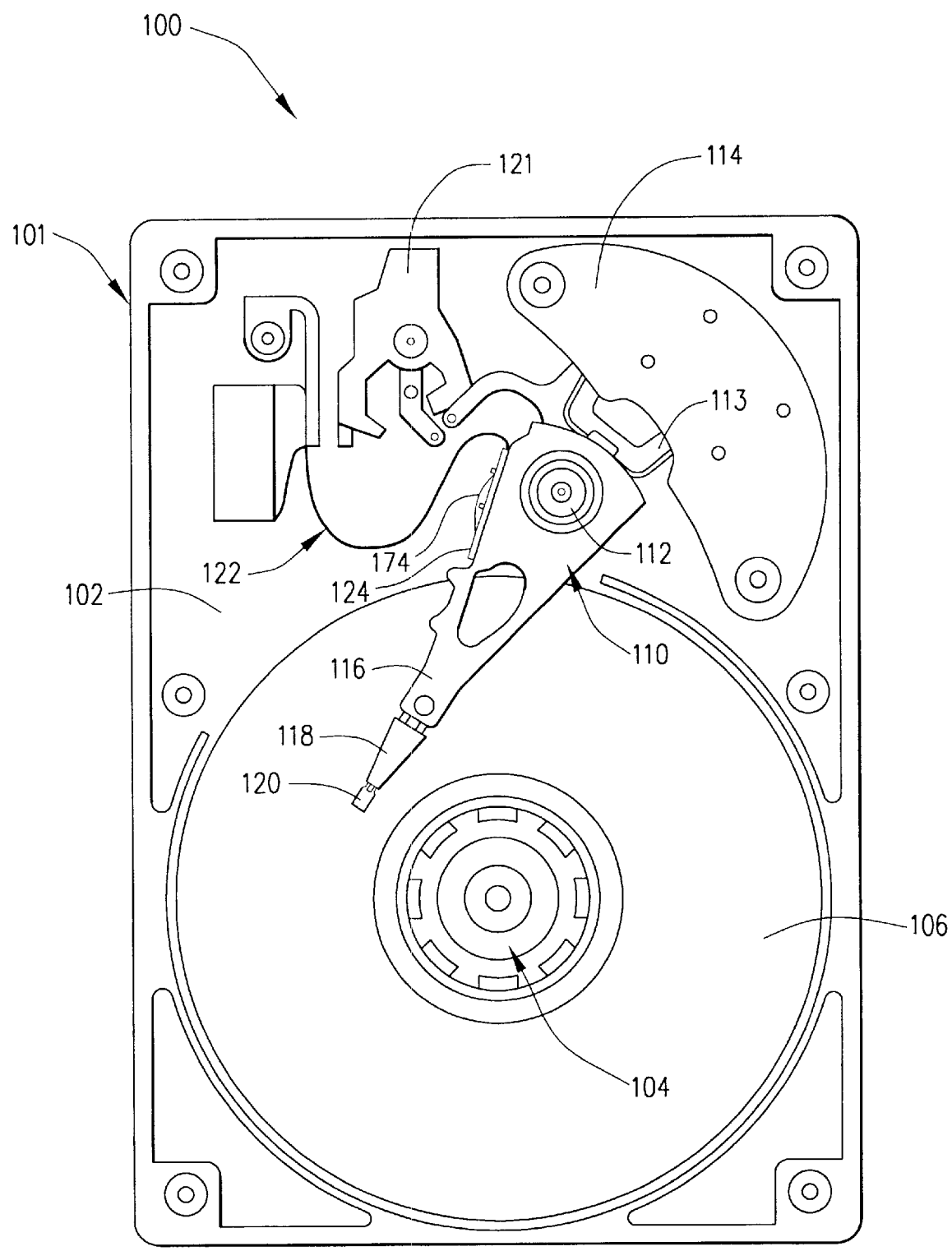
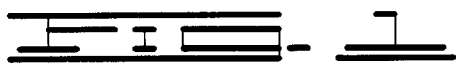

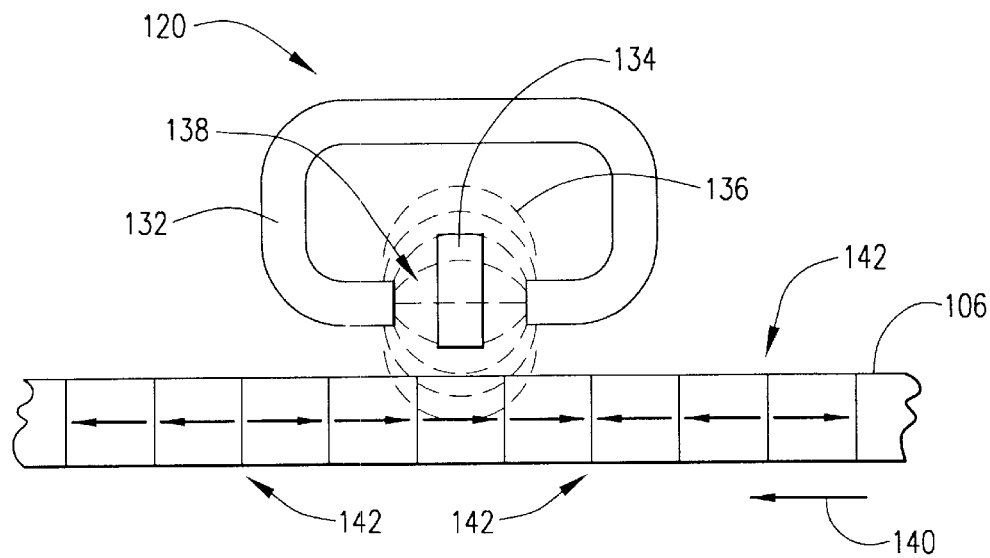
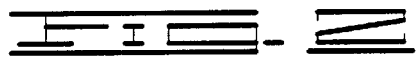
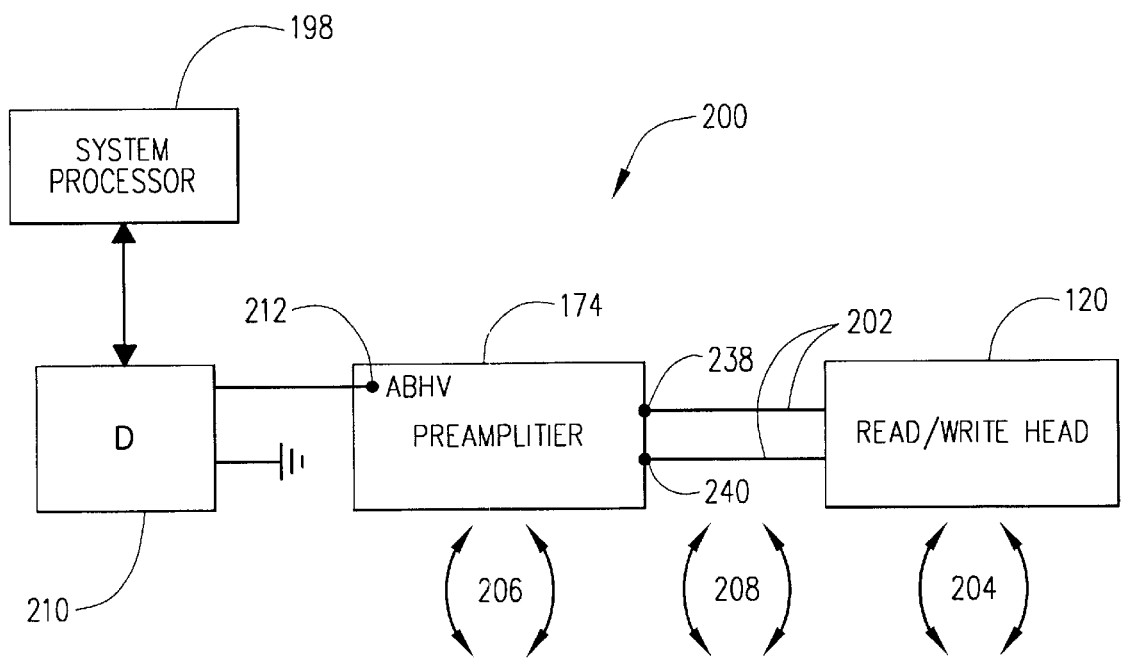
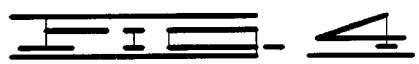

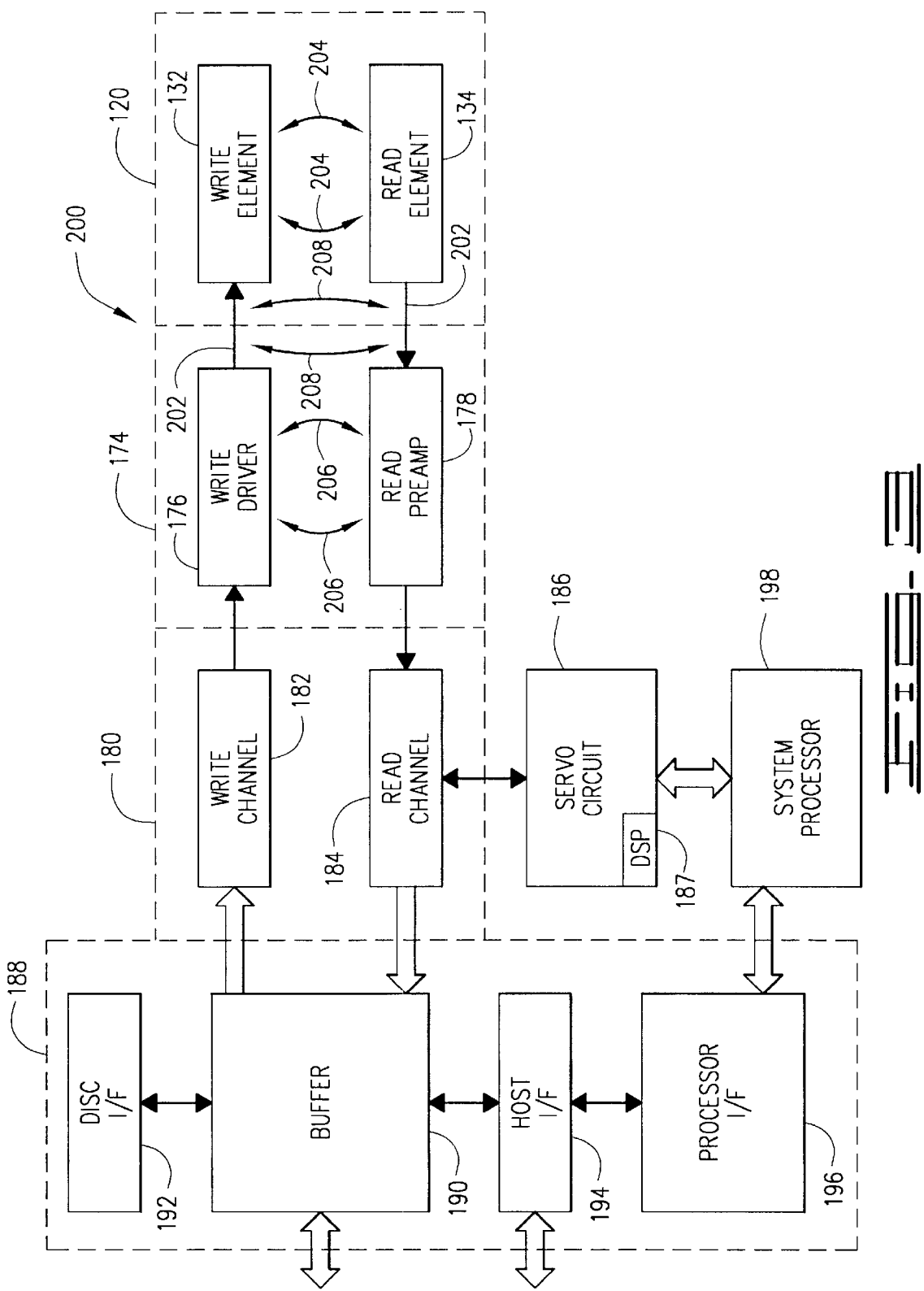

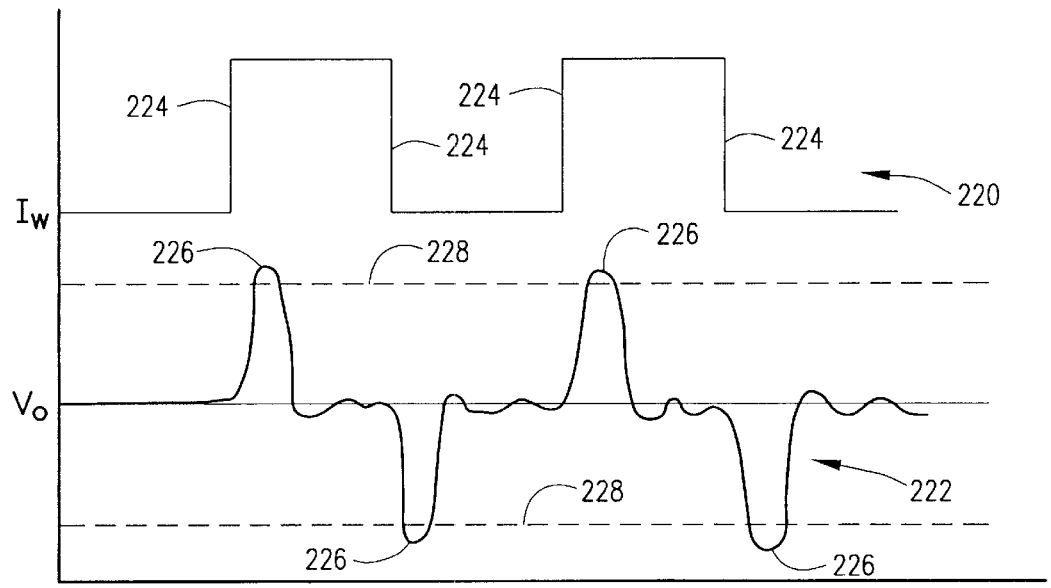
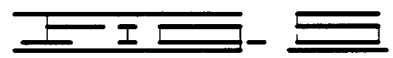
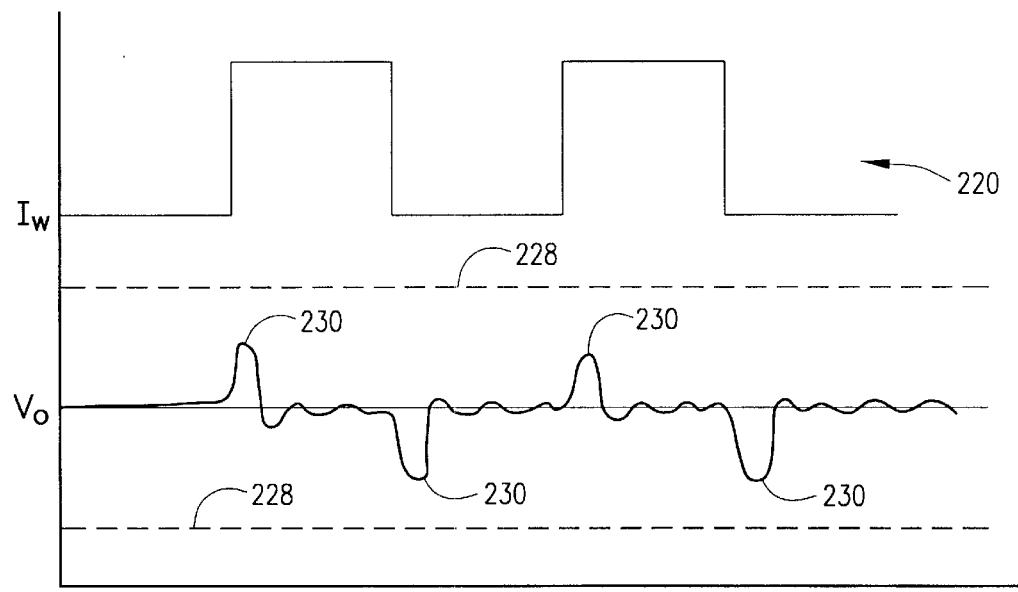
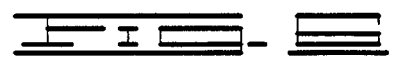

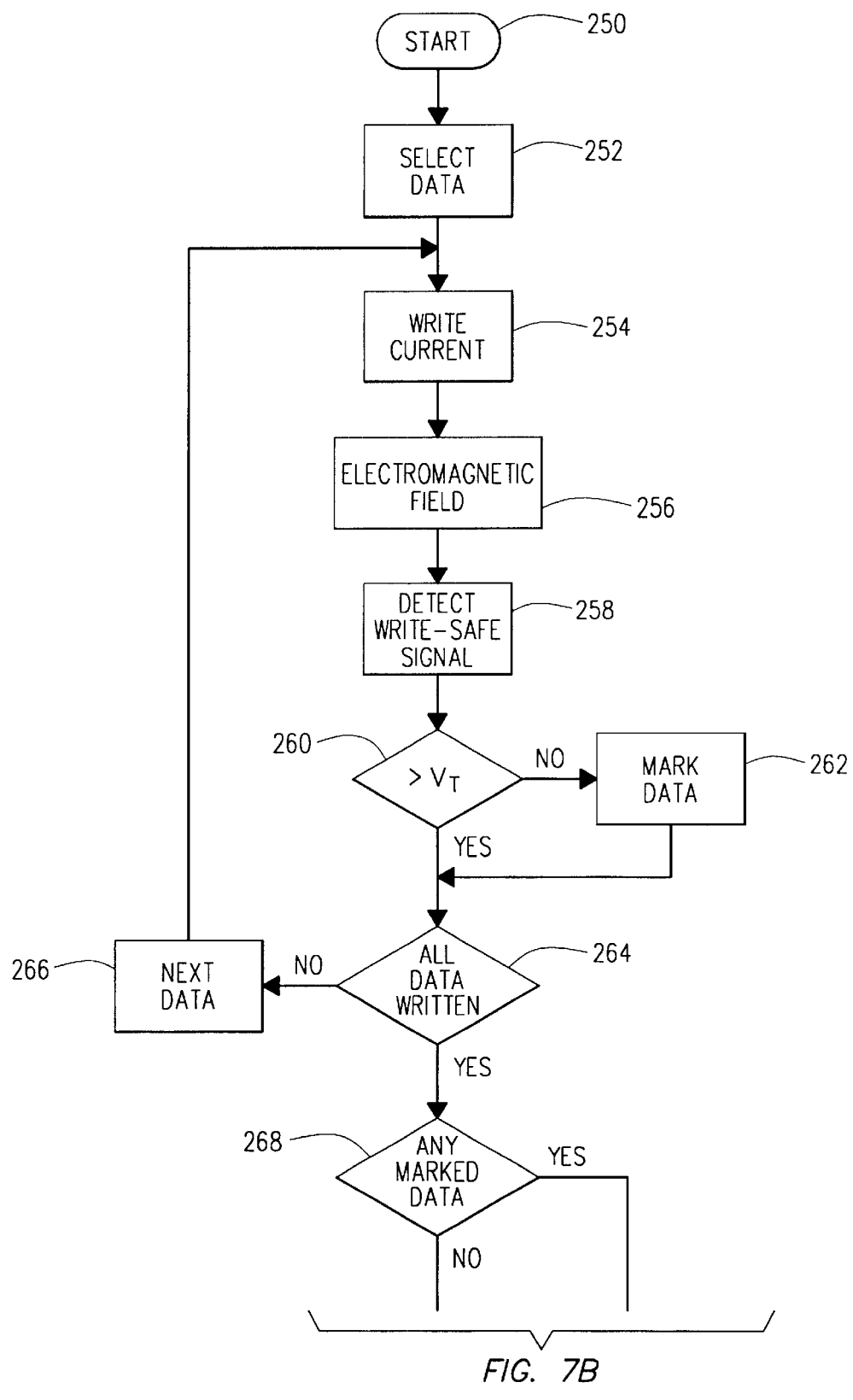
FIG. 7B

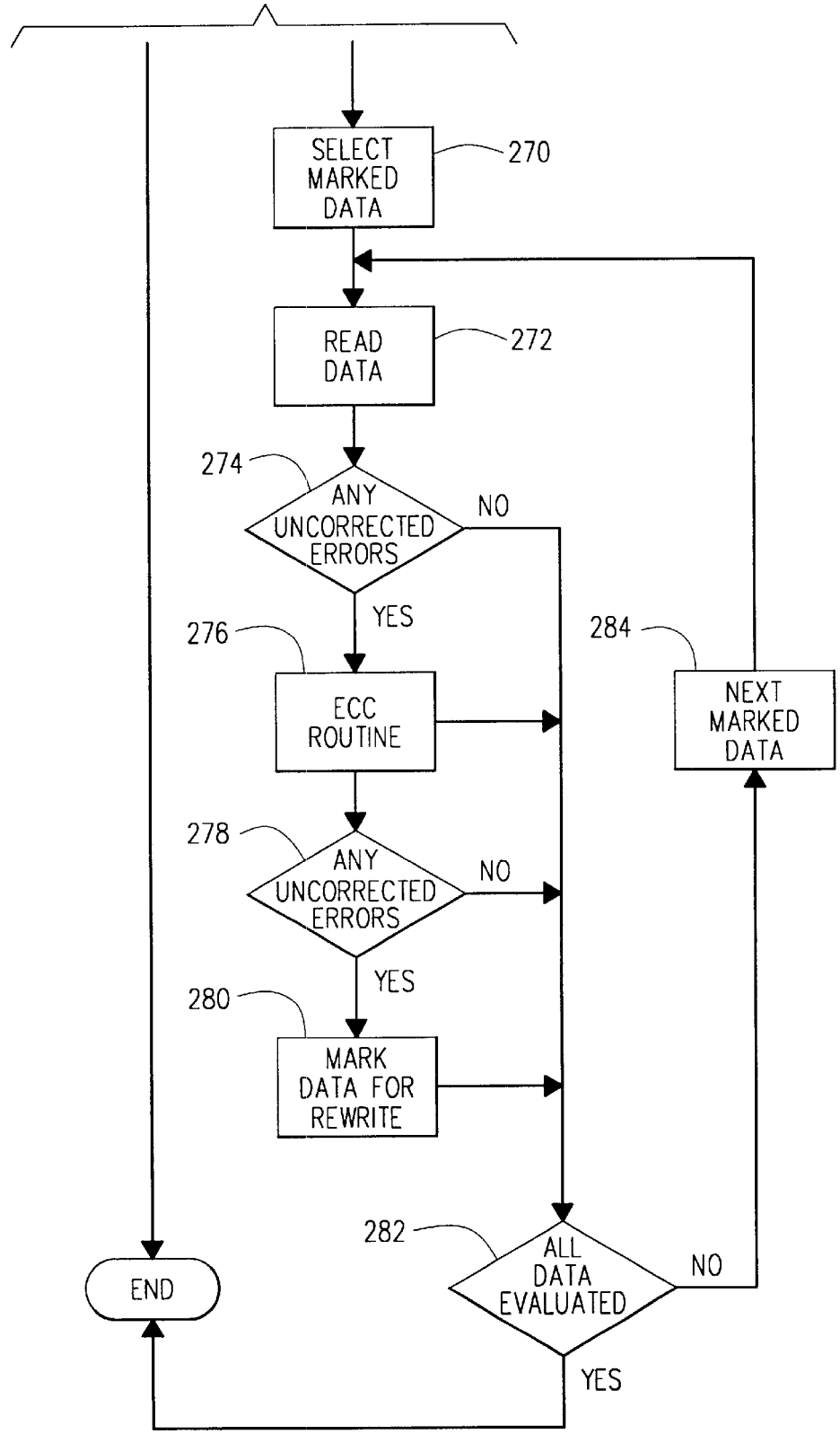
FIG. 7A

WRITE-SAFE CONDITION VERIFICATION APPARATUS AND METHOD FOR THE WRITE ELEMENT IN A DISC DRIVE

CROSS REFERENCE TO RELATED APPLICATIONS

This application claims the benefit of U.S. Provisional Application No. 60/302,195.

FIELD OF THE INVENTION

This invention relates generally to the field of disc drive data storage devices and more particularly, but without limitation, to performing real-time, closed loop write verification by detecting electromagnetic coupling of constituent components making up the write path in the disc drive.

BACKGROUND OF THE INVENTION

Modern data storage devices such as disc drives are commonly used in a multitude of computer environments to store large amounts of data in a form that is readily available to a user. Generally, a disc drive has a magnetic disc, or two or more stacked magnetic discs, that are rotated by a motor at high speeds. Each disc has a data storage surface divided into a series of generally concentric data tracks where data is stored in the form of magnetic flux transitions.

A data transfer member (sometimes referred to as a read/write head) such as a magnetic transducer is moved by an actuator to selected positions adjacent the data storage surface to sense the magnetic flux transitions in reading data from the disc, and to transmit electrical signals to induce the magnetic flux transitions in writing data to the disc. The active elements of the data transfer member are supported by suspension structures extending from the actuator. The active elements are maintained a small distance above the data storage surface as the data transfer member flies upon an air bearing generated by air currents caused by the spinning discs.

Each read/write head is typically provided with separate read and write elements, with a common configuration utilizing a thin film, inductive write element and a magnetoresistive (MR) read element. Data are written by passing a write current through the write element, with the write current generating a time-varying electromagnetic field which accordingly magnetizes the disc surface. Previously written data are read using the read element to transduce the selective magnetization of the disc to generate a read signal which is received by a read channel to reconstruct the data. An interface circuit buffers and controls the transfer of data between the disc and a host computer.

Technological advancements in the art have resulted in continued improvements in disc drive data storage capacities and transfer rates, as well as the reliability with which the data is stored and recalled. Design cycle times are continually being accelerated as well, with each new generation typically providing a doubling in storage capacity. These fast-paced advancements have driven the need for improved methodologies that ensure that data is consistently and accurately stored and retrieved.

One such methodology to ensure data integrity involves the grouping of a plurality of disc drives into a multi-drive array, sometimes referred to as a RAID ("Redundant Array of Inexpensive Discs"). Since their introduction, RAIDs have found widespread use in a variety of applications requiring significant levels of data transfer, capacity and integrity performance. One such RAID architecture employs mirroring, where data is simultaneously written to two or more disc drives. Another approach employs striping, where portions of data streams are written to different disc drives. Yet another approach employs interleaving wherein various types of error detection and correction schemes are carried out at multiple levels.

Another popular methodology useful in ensuring data integrity is write verification, which involves the writing of data to a disc followed by a subsequent read operation where the previously stored data are retrieved from the disc to ensure the data were correctly written. However, such write verification operations undesirably decrease the data transfer performance of the disc drive, as each write operation requires each sector to which data are written to be accessed at least twice: first, when the data are written, and second, when the data are subsequently read back for verification. Conventional write verification techniques accordingly impose a severe penalty on disc drive performance, limiting data transfer rates to levels substantially below that which would be otherwise achievable.

Yet another methodology involves real-time monitoring of the write head during a write operation. Writing failures can stem from a defective write element; that is, a write element that is electrically open or shorted. During data writing operations there exists an observable expected amount of electromagnetic coupling within the constituent parts of the electrical read/write path. It has been determined that an optimal solution for ensuring a write-safe condition of the write element lies in simultaneously verifying the expected electromagnetic coupling effects while writing data. It is to these improvements and others as exemplified by the description and appended claims that embodiments of the present invention are directed.

SUMMARY OF THE INVENTION

The embodiments of the present invention contemplate a disc drive comprising a rotatable disc having a magnetic recording surface, and a data reading and writing assembly. The data reading and writing assembly comprises a read/write head comprising a write element and a read element, both adjacent the recording surface; a preamplifier comprising a write driver applying a series of write currents for writing data to the recording surface and a read amplifier for reading stored data from the recording surface; and an interconnect joining the write driver to the write element so as to generate time-varying electromagnetic fields selectively magnetizing the recording surface in response to the write currents, and joining the read amplifier to the read element so as to transduce magnetization vectors on the recording surface associated with stored data. The disc drive furthermore comprises a detection circuit connected to the data reading and writing assembly, receiving a write-safe signal indicative of a write-safe condition, the write-safe signal comprising a sum of constituent operable electromagnetic coupling values of the read/write head, the preamplifier and the interconnect.

In one embodiment the detection circuit is connected to the preamplifier and receives the write-safe signal when a bias current is directed to the read element while writing data to the recording surface, such that a reversal in the writing current generates an electromagnetic coupling effect in the bias current. An advantageous construction comprises adaptively connecting the circuit to the analog buffer head voltage terminal of the preamplifier.

Embodiments of the present invention further contemplate a method for writing data in a data storage device, comprising: (a) generating a write current signal associated with the data to be written with a write driver portion of a preamplifier; (b) transmitting the write current signal along an interconnect to a magneto resistive write element portion of a read/write head to generate a time-varying electromagnetic field imparting flux transitions associated with the data in a data storage portion of the data storage device; (c) supplying a bias current to a read portion of the read/write head; (d) while transmitting the write current, simultaneously reading an electromagnetic coupling signal comprising constituent coupling signals of the preamplifier, the interconnect and the read/write head; and (e) comparing the electromagnetic coupling signal to a threshold value indicative of a write-safe condition of the write element.

These and various other features as well as advantages which characterize the present invention will be apparent upon reading of the following detailed description and review of the associated drawings.

BRIEF DESCRIPTION OF THE DRAWINGS

FIG. 1 is a plan view of a data storage device constructed in accordance with an embodiment of the present invention.

FIG. 2 is a diagrammatical representation of the read/write head of the data storage device of FIG. 1.

FIG. 3 is a functional block diagram of the data storage device of FIG. 1.

FIG. 4 is a functional block diagram of the data reading and writing assembly of FIG. 3 with a write-safe detection circuit connected to the analog buffer head voltage terminal of the preamplifier.

FIG. 5 graphically illustrates a write current and a corresponding write-safe signal of an operative write element; FIG. 6 similarly graphically illustrates an inoperative write element.

FIG. 7 is a WRITE ELEMENT ENABLE VERIFICATION routine, illustrative of a method in accordance with embodiments of the present invention for on-the-fly verifying an enabled mode of the write element during the data writing mode.

DETAILED DESCRIPTION

Referring to the drawings in general, and more particularly to FIG. 1, shown therein is a plan view of a disc drive 100 constructed in accordance with preferred embodiments of the present invention.

The disc drive 100 includes a head-disc assembly (HDA) 101 and a disc drive printed wiring assembly (PWA) which is mounted to the underside of the HDA 101 and thus, not visible in FIG. 1. As discussed below, the PWA provides circuitry necessary to control the operation of the HDA 101 and to transfer data between the HDA 101 and a host computer in which the disc drive 100 can be mounted in a user environment.

The HDA 101 includes a base deck 102 to which various disc drive components are mounted. A top cover, which has been omitted from FIG. 1 to facilitate the present discussion, cooperates with the base deck 102 to form an internal, sealed environment for the disc drive 100. A spindle motor 104 is provided to rotate a stack of discs 106 at a constant high speed, with a disc clamp 108 securing the discs to the spindle motor 104.

To access the discs 106, a controllably positionable actuator assembly 110 is provided which rotates about a cartridge bearing assembly 112 in response to currents applied to a coil (a portion of which is shown at 113) of a voice coil motor (VCM) 114. The actuator assembly 110 includes a plurality of arms from which corresponding flexure assemblies extend, the topmost of which are identified at 116 and 118, respectively. Heads 120 are provided at distal ends of the flexure assemblies 116, 118 and are supported over the discs 106 by air bearings established by air currents set up by the rotation of the discs 106.

A latch assembly 121 is provided to secure the heads 120 over landing zones, such as at the innermost diameters of the discs 106 when the disc drive 100 is deactivated. A flex circuit assembly 122 provides electrical communication paths between the actuator assembly 110 and the disc drive PWA.

Referring to FIG. 2, each of the heads 120 includes a thin-film inductive write element 132 and a magnetoresistive (MR) read element 134. The write element 132 writes data to the corresponding disc 106 by generating a time varying electromagnetic field (indicated generally at 136) across a gap 138 in response to write currents applied to the write element 132. The electromagnetic field 136 operates to selectively magnetize the disc 106 along a direction of movement of the disc 106 (as indicated by arrow 140). Magnetic flux transitions result at locations where reversals in the magnetization of the disc occur, such as shown at 142.

The read element 134, preferably disposed in the write gap 138 of the write element 132, is characterized as providing a changed electrical resistance in the presence of an electromagnetic field of selected orientation. Hence, by passing a bias current through the read element 134, previously stored data can be transduced from the magnetized disc surface and converted to a readback signal in relation to changes in the voltage across the read element.

FIG. 3 illustrates a generalized functional block diagram of the control electronics arranged on the disc drive PWA in accordance with preferred embodiments of the present invention. One of the heads 120 is illustrated, with corresponding write and read elements 132, 134. A preamplifier circuit 174 includes a write driver 176 and a read amplifier 178. The write driver 176 applies write currents to the write element 132 and the read amplifier 178 applies a read bias current to the read element 134. A communication channel 180 is operably connected to the preamplifier 174, and includes a write channel 182 which encodes and serializes input user data for writing by the write driver 176, and a read channel 184 which receives readback signals from the read amplifier 178 and reconstructs previously stored user data therefrom.

Servo data from the disc 106 (FIG. 1) is passed from the read channel 184 to a servo circuit 186, which includes a programmable digital signal processor (DSP) 187 to carry out head 120 positioning operations. An interface circuit 188 has a buffer 190 to temporarily store data during data transfer operations between the discs 106 and a host computer. Transfers between the buffer 190 and discs 106 are controlled by a disc interface 192, and transfers between the buffer 190 and the host computer are controlled by a host interface 194. A processor interface 196 enables communication between the interface circuit 188 and a system processor 198, which controls overall operation of the disc drive 100.

Summarizing, for clarity sake, the disc drive 100 can be said to comprise a data reading and writing assembly 200 comprising three constituent parts—the head 120, the preamplifier 174, and an electrical interconnect 202 electrically connecting the head 120 and the preamplifier 174. The read/write head 120 comprises the write element 132 and the read element 134, both adjacent the recording surface of the data storage disc 106. The preamplifier 174 comprises the write driver 176 applying a series of write currents for writing data to the recording surface and the read amplifier 178 for reading stored data from the recording surface. The interconnect 202 joins the write driver 176 to the write element 132 so as to generate time-varying electromagnetic fields selectively magnetizing the recording surface in response to the write currents. The interconnect 202 also joins the read amplifier 178 to the read element 134 so as to transduce magnetization vectors on the recording surface associated with stored data.

If the read amplifier 178 is activated to generate the bias current during the time that the write driver 176 is activated to send a write current to the write element 132, then the reversal in the writing current 142 (FIG. 2) generates an electromagnetic coupling effect in the bias current. In operable conditions, the electromagnetic coupling occurs in all three constituent parts of the data reading and writing assembly 200 at various magnitudes based on the characteristic construction of the parts. That is, if the head 120 has a properly wound and connected transducer coil, then an expected electromagnetic coupling effect 204 will occur between the write element 132 and the read element 134. Likewise, if the circuits are properly connected in the preamplifier 174 then an expected electromagnetic coupling effect 206 will occur between the write driver 176 and the read amplifier 178. Likewise, if the circuits, such as in a flex on suspension (FOS), are properly constructed and connected, then an expected electromagnetic coupling effect 208 will occur between the respective leads 202.

Summing the constituent coupling effects 204, 206, 208 can provide a write-safe signal indicative of a data reading and writing assembly 200 that is operative. That is, by comparing the write-safe signal to a predetermined threshold value then defective and marginal components can be screened. For example, if the write element 132 is either electrically shorted or electrically open then no constituent coupling effect 204 will be produced, thereby decreasing the value of the write-safe signal.

FIG. 4 diagrammatically illustrates the data reading and writing assembly 200 illustrating one manner of detecting the write-safe signal. In a preferred embodiment a detection circuit 210 is connected to the analog buffer head voltage (ABHV) terminal 212 of the preamplifier 174. In this manner the detection circuit 210 can provide on-board continuous monitoring of the write-safe signal, and communicate with the system processor 198 to compare the value of the write-safe signal to a saved threshold value in order to control the operations of the disc drive 100 accordingly. In a preferred embodiment the minimum expected write-safe signal level is determined and a threshold value is preselected and saved such that an observed write-safe value less than the threshold value indicates an inoperative data reading and writing assembly 200. Preferably, the coupling effect induces voltage transitions in the bias current that are detectable by the detection circuit 210.

FIG. 5 graphically illustrates this screening process by the detection circuit 210. A write signal, such as a 2T signal, curve 220 and the write-safe signal 222 are each plotted against a common x-axis representing elapsed time and a common y-axis representing respective signal amplitudes. The write current signal 220 generally represents pulsed write currents that are applied by the write over 176 (FIG. 3) to the write element 132 (FIG. 3) to selectively magnetize the disc 106 (FIG. 1). Transitions in the write current polarity 224 generate corresponding flux transitions 142 (FIG. 2) on the disc surface.

The coupling electromagnetic signal, or write-safe signal, 222 generally represents the sum of the constituent coupling effects of the preamplifier 174, the head 120, and the interconnect 202. The write-safe signal 222 has positive and negative peaks 226 associated with the magnitude of the coupling effects. A predetermined threshold value 228 is saved and compared to the amplitude of the peaks, such as with a peak detect method, to determine a write-safe signal 222 indicative of a properly operating data reading and writing assembly 200. If, for example, the write element 132 (FIG. 3) is inoperative, such as because of an electrical short-circuit or an electrical open-circuit, then the amplitude 226 will be correspondingly reduced. FIG. 6 illustrates this case where the amplitude 230 is less than the threshold value 228.

In a preferred embodiment the threshold value 228 (FIG. 5) is selected so as to indicate an inoperative or marginal condition of the write element 132. Accordingly, it is necessary to determine the value of the constituent coupling effect contributed only by the write element 132 to the write-safe signal. First, the contribution made by the preamplifier 174 can be determined by short-circuiting the output terminals 238, 240 (FIG. 4) and disconnecting the interconnect 202 from the preamplifier 174. In an experimental trial it was determined that the preamplifier 174 accounted for 34% of the total write-safe signal, such that the interconnect 202 and the head 120 accounted for the balance of 66% of the total write-safe signal. Thereafter, the output terminals 238, 240 from the preamplifier 174 can be unshorted and the interconnect 202 reconnected. Then the write element 132 is electrically disconnected from the interconnect 202. In a continuation of the experimental trial it was determined that the head 120 contribution was 55% and the interconnect 202 contribution was 11%, respectively, of the total write-safe signal. Accordingly, the threshold value ($V_T$) can be set nominally at 55% of the total observed write-safe signal value to screen for inoperative heads 120.

The embodiments of the present invention contemplate a method for writing data in a data storage device by the apparatus described hereinabove. The method comprises: generating the write current signal 224 associated with the data to be written with the write driver 176 portion of the preamplifier 174; transmitting the write current signal 224 along the interconnect 202 to the magnetoresistive write element 132 portion of the head 120 to generate the time-varying electromagnetic field 136 imparting flux transitions 142 associated with the data in the data storage portion of the data storage device; supplying the bias current to the read element 134 portion of the head 120; while transmitting the write current, simultaneously reading the electromagnetic coupling signal 222 comprising constituent coupling signals of the preamplifier 206, the interconnect 208 and the head 204; and comparing the electromagnetic coupling signal 222 to the threshold value 228 indicative of the write-safe condition of the write element 132.

Additionally, the embodiments contemplate a method wherein the reading step is accomplished by connecting a detection circuit 210 to the analog buffer head voltage terminal 212 of the preamplifier 174. Furthermore, a minimum or threshold expected electromagnetic coupling signal can be determined such that a write-safe condition is indicated when the observed write-safe signal is greater than the threshold value. The constituent coupling signal of the preamplifier 206 can be determined by short-circuiting the output terminals 238, 240 of the preamplifier 174 and disconnecting the interconnect 202 while generating the write current signal 224. The constituent coupling signal of the interconnect 208 can be determined by subsequently unshorting the output terminals 238, 240, reconnecting the interconnect 202, and removing the write element 132 of the head 120. The write element 132 can be removed by either short-circuiting the input terminals of the head 120 or by disconnecting the input lead of the write element 132.

FIG. 7 provides a flow chart for a WRITE VERIFICATION routine 250, illustrative of steps carried out by the disc drive 100 in accordance with a preferred embodiment to perform closed-loop write verification of data written to the discs 106. With reference to both FIGS. 3 and 7, during a write operation, the first set of data to be written is selected, as shown by step 252. While the amount of data in the first set of data can vary depending on the application, preferably the first set of data represents an amount that can be accommodated by the user data field of a selected data block, such as 512 kilobytes (kB). Of course, a large user file is typically broken down and written to a number of data blocks, with the file being transferred to the buffer 190 and incrementally outputted to the write channel 182.

The write channel 182 operates to encode and serialize the data to enable the write driver 176 in block 254. This operation includes run-length limited (RLL) and error correction code (ECC) encoding, to facilitate subsequent retrieval of the recorded data.

The write currents generated at block 254 are applied to the write element 132 in block 256 to generate the time-varying electromagnetic field necessary to write the data to the corresponding data field on the disc 106. Simultaneously, as shown by block 258, the detection circuit 210 detects the time-varying electromagnetic field, or write-safe signal, which is the sum of the electromagnetic coupling effects of the preamplifier 174, the head 120, and the interconnect 202.

It will be noted that the write-safe signal is generated in response to the electromagnetic fields from the write driver 174, the write element 132, and the interconnect 202, and not from the selective magnetization of the disc 106. In this regard, the detection circuit 210 senses the operation of the constituent parts in real time, or on-the-fly, unlike conventional write verification schemes where the read element 134 subsequently transduces previously written data from the disc 106.

In block 260 the value of the write-safe signal is compared to a stored threshold value. If the write-safe signal is less than the threshold value then the data block is marked for subsequent evaluation in block 262. Such marking is typically achieved using a status register which indicates the status of the various data blocks of the disc drive 100. The routine next determines whether additional sets of data remain to be written at block 264; if so, the next block of data is selected in block 266 and control returns to block 254.

When all of the data has been written, the routine continues to block 268 which determines whether any of the accessed data blocks have been marked for further evaluation. If so, the first such marked data block is selected at block 270 and a conventional read verification operation is performed at block 272. That is, the read element 134 is positioned over the associated data block to transduce the selective magnetization of the data block to generate a readback signal that is presented to the read channel 184 for reconstruction. If any uncorrected errors are detected in the recovered data by block 274, the error recovery routines are applied at block 276 in an attempt to recover the data. Such routines can involve adjustment of various read channel and preamplifier parameters, application of a position offset to move the read element away a selected distance form the center of the track, etc.

A determination is then made in block 278 as to whether the correction operation of block 276 was successful. If any uncorrected errors still remain, the data block is marked by block 280 for a rewrite operation. The routine continues to block 282 to determine whether additional data blocks have been marked for evaluation; if so, the next marked data block is selected at block 284 and control returns to block 272.

In summary, the embodiments of the present invention contemplate a disc drive (such as 100) comprising a rotatable disc (such as 106) having a magnetic recording surface, and a data reading and writing assembly (such as 200). The data reading and writing assembly comprises a head (such as 120) comprising a write element (such as 132) and a read element (such as 134), both adjacent the recording surface; a preamplifier (such as 174) comprising a write driver (such as 176) applying a series of write currents (such as 224) for writing data to the recording surface and a read amplifier (such as 178) for reading stored data from the recording surface; and an interconnect (such as 202) joining the write driver to the write element so as to generate time-varying magnetic fields (such as 136) selectively magnetizing the recording surface in response to the write currents, and joining the read amplifier to the read element so as to transduce magnetization vectors on the recording surface associated with stored data. The disc drive furthermore comprises a detection circuit (such as 210) connected to the data reading and writing assembly, receiving a write-safe signal (such as 222) indicative of a write-safe condition, the write-safe signal comprising a sum of constituent operable magnetic coupling values of the read/write head (such as 204), the preamplifier (such as 206) and the interconnect (such as 208).

In one embodiment the detection circuit is connected to the preamplifier and receives the write-safe signal when a bias current is directed to the read element while writing data to the recording surface, such that a reversal in the writing current (such as 142) generates an electromagnetic coupling effect in the bias current. An advantageous construction comprises adaptively connecting the circuit to the analog buffer head voltage terminal (such as 212) of the preamplifier.

Embodiments of the present invention further contemplate a method for writing data in a data storage device, comprising: (a) generating a write current signal associated with the data to be written with a write driver portion of a preamplifier; (b) transmitting the write current signal along an interconnect to a magnetoresistive write element portion of a read/write head to generate a time-varying electromagnetic field imparting flux transitions associated with the data in a data storage portion of the data storage device (such as 254); (c) supplying a bias current to a read portion of the head; (d) while transmitting the write current, simultaneously reading an electromagnetic coupling signal comprising constituent coupling signals of the preamplifier, the interconnect and the read/write head (such as 258); and (e) comparing the electromagnetic coupling signal to a threshold value indicative of a write-safe condition of the write element (such as 260).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the type an arrangement of the constituent parts making up the data reading and writing assembly may vary while maintaining substantially the same functionality without departing from the scope and spirit of the present invention. In addition, although the preferred embodiment described herein is directed to a data storage device, it will be appreciated by those skilled in the art that the teachings of the present invention can be applied to other systems, like data storage test or certification systems, servo track writers, optical data storage systems, or any other assembled product which can be automatically assembled, without departing from the scope and spirit of the present invention.

What is claimed is:

1. A disc drive, comprising:
   a rotatable disc having a magnetic recording surface;
   a data reading and writing assembly, comprising:
      a read/write head comprising a write element and a read element, both adjacent the recording surface;
      a preamplifier comprising a write driver applying a series of write currents for writing data to the recording surface and a read amplifier for reading stored data from the recording surface; and
      an interconnect joining the write driver to the write element so as to generate time-varying magnetic fields selectively magnetizing the recording surface in response to the write currents, and joining the read amplifier to the read element so as to transduce magnetization vectors on the recording surface associated with stored data; and
   a circuit connected to the data reading and writing assembly, receiving a write-safe signal indicative of a write-safe condition, the write-safe signal comprising a sum of constituent operable magnetic coupling values of the read/write head, the preamplifier and the interconnect.

2. The disc drive of claim 1 wherein the circuit is connected to the preamplifier and receives the write-safe signal when a bias current is directed to the read element while writing data to the recording surface, such that a reversal in the writing current generates an electromagnetic coupling effect in the bias current.

3. The disc drive of claim 2 wherein the circuit is adaptively connected to the analog buffer head voltage terminal of the preamplifier.

4. The disc drive of claim 2 wherein the coupling effect comprises constituent coupling effects of the preamplifier, the read/write head, and the interconnect.

5. The disc drive of claim 2 wherein the circuit compares the coupling effect to a preselected threshold value in order to distinguish the write-safe condition.

6. The disc drive of claim 5 wherein the write-safe condition is defined by a coupling effect that is greater than the threshold value.

7. The disc drive of claim 2 wherein the coupling effect induces voltage transitions detectable by the circuit.

8. A method for writing data in a data storage device, comprising:
   (a) generating a write current signal associated with the data to be written with a write driver portion of a preamplifier;
   (b) transmitting the write current signal along an interconnect to a magnetoresistive write element portion of a read/write head to generate a time-varying electromagnetic field imparting flux transitions associated with the data in a data storage portion of the data storage device;
   (c) supplying a bias current to a read element portion of the read/write head;
   (d) while transmitting the write current, simultaneously reading an electromagnetic coupling signal comprising constituent coupling signals of the preamplifier, the interconnect and the read/write head; and
   (e) comparing the electromagnetic coupling signal to a threshold value indicative of a write-safe condition of the write element.

9. The method of claim 8 wherein the reading step (d) is accomplished by connecting a detection circuit to the analog buffer head voltage terminal of the preamplifier.

10. The method of claim 8 wherein the comparing step (e) indicates a write-safe condition when the electromagnetic coupling signal is greater than the threshold value.

11. The method of claim 8 wherein the constituent coupling signal of the preamplifier is determined by short-circuiting the output terminals of the write driver and disconnecting the interconnect while generating the write current signal of step (a).

12. The method of claim 11 wherein the constituent coupling signal of the interconnect is determined by unshorting the output terminals, reconnecting the interconnect, and removing the write element of the read/write head.

13. The method of claim 12 wherein the removing the write element comprises shorting the input terminals of the read/write head.

14. The method of claim 12 wherein the removing the write element comprises disconnecting the input lead of the write element.

15. A data storage device, comprising:
   a moveable actuator operably engaging a rotating data storage disc, and a data read/write path transmitting electrical currents for storing data to the disc, the read/write path comprising a preamplifier and a read/write head electrically joined by an interconnect; and
   means for determining an operative write-safe condition of the read/write path in relation to the constituent operative electromagnetic coupling effects of the preamplifier, the read/write head, and the interconnect.

16. The data storage device of claim 15 wherein the means for determining an operative write-safe condition comprises a detection circuit connected to the preamplifier receiving a write safe-signal indicative of the write-safe condition, the write safe signal comprising constituent operable magnetic coupling values of the read/write head, the preamplifier, and the interconnect.

17. The data storage device of claim 16 wherein the detection circuit receives the write-safe signal when a bias current is applied to a read element portion of the read/write head while writing data to the disc with a write current from a write driver portion of the preamplifier, such that a reversal in the write current generates an electromagnetic coupling effect in the bias current.

18. The data storage device of claim 17 wherein the detection circuit is adaptively connected to the analog buffer head voltage terminal of the preamplifier.

19. The data storage device of claim 18 wherein the detection circuit compares the coupling effect to a preselected threshold value in order to distinguish the write-safe condition.

20. The data storage device of claim 19 wherein the write-safe condition is defined by a coupling effect that is greater than the threshold value.

* * * * *